United States Patent
Nolte et al.

(10) Patent No.: US 9,080,066 B2
(45) Date of Patent: Jul. 14, 2015

(54) WOOD SUBSTRATE FURNISHED WITH A FLAME RETARDANT

(71) Applicant: Lufthansa Technik AG, Hamburg (DE)

(72) Inventors: Mathias Nolte, Hamburg (DE); Monika Bauer, Koenigs Wusterhausen (DE); Sebastian Steffen, Berlin (DE); Bettina Gajetzki, Langenfeld (DE); Nina Schneider, Wuelfrath (DE); Thomas Palm, Dueren-Merken (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 13/951,953

(22) Filed: Jul. 26, 2013

(65) Prior Publication Data

US 2014/0234632 A1    Aug. 21, 2014

(30) Foreign Application Priority Data

Feb. 15, 2013   (DE) .......................... 10 2013 202 493

(51) Int. Cl.

| | |
|---|---|
| *C09D 5/18* | (2006.01) |
| *B27K 3/34* | (2006.01) |
| *C09K 21/06* | (2006.01) |
| *C09K 21/08* | (2006.01) |
| *C09K 21/12* | (2006.01) |
| *B27K 3/02* | (2006.01) |
| *B27K 3/04* | (2006.01) |
| *B27K 3/08* | (2006.01) |

(52) U.S. Cl.
CPC ... *C09D 5/18* (2013.01); *B27K 3/34* (2013.01); *C09K 21/06* (2013.01); *C09K 21/08* (2013.01); *C09K 21/12* (2013.01); *B27K 3/0278* (2013.01); *B27K 3/04* (2013.01); *B27K 3/08* (2013.01); *B27K 2240/30* (2013.01)

(58) Field of Classification Search
CPC .......... C09D 5/18; B27K 3/0278; B27K 3/04; B27K 3/08; B27K 3/34; B27K 2240/30; C09K 21/06; C09K 21/08; C09K 21/12
USPC ................... 428/537.1, 413, 423.1, 480, 523; 427/393, 393.3, 397, 297, 402
IPC ........................... B32B 11/00; B27K 3/15, 5/06
See application file for complete search history.

(56) References Cited

U.S. PATENT DOCUMENTS

| | | | | |
|---|---|---|---|---|
| 4,285,997 | A | * 8/1981 | Vasishth et al. | ............... 427/393 |
| 4,782,109 | A | * 11/1988 | DuLaney et al. | ............. 524/501 |
| 5,200,457 | A | * 4/1993 | Vasishth et al. | ............... 524/437 |
| 5,534,305 | A | * 7/1996 | Fujiki et al. | ................... 427/393 |
| 7,029,725 | B2 | * 4/2006 | Pepe et al. | ..................... 427/393 |

FOREIGN PATENT DOCUMENTS

| | | | |
|---|---|---|---|
| EP | 0702624 | * | 11/2001 |
| EP | 0702624 | B1 | 11/2001 |
| WO | 94/29102 | | 12/1994 |

* cited by examiner

*Primary Examiner* — Leszek Kiliman
(74) *Attorney, Agent, or Firm* — Casimir Jones S.C.

(57) ABSTRACT

The invention relates to a wood substrate rendered flame-retardant. The invention provides that on the substrate there is a coating and/or impregnation system with a flame retardant selected from the group consisting of room-temperature-liquid organic halogen compounds and organic phosphorus compounds and organic boron compounds, and that there is also a layer of coating material applied thereto.

10 Claims, No Drawings

WOOD SUBSTRATE FURNISHED WITH A FLAME RETARDANT

This application claims priority to German Patent Application 102013202493.2 filed Feb. 15, 2013.

The invention relates to a wood substrate rendered flame retardant, and also to a process for production thereof.

The invention relates to a process for the application of a fire-resistant coating to a substrate, and also to a substrate correspondingly coated.

In the fitting-out of indoor spaces, use is frequently made of cladding, furniture, or the like with wood surfaces, in particular with wood veneers. The purpose of the veneer here is firstly to improve the appearance of the surface and secondly protection by way of example from mechanical stresses. In certain cases a coating of this type also serves to improve flame-protection.

By way of example, when furniture or cladding is installed into the interior of an aircraft, it is necessary to comply with fire-performance requirements imposed in legislation relating to air travel. This type of component is by way of example exposed to a flame with a temperature of 860° C. in a Bunsen burner fire test for 60 s. Once the flame has been removed, extinguishment of the component must take place within 15 s. The distance between the point of application of the flame and the point of furthest extent of burning on the specimen surface is not permitted to exceed 155 mm (FAA CS 25.853 (a)).

It is known from public prior use that wood can be provided with a flame-retardant impregnation system. A disadvantage here is that this type of impregnation system can discolor the wood and sometimes acts as plasticizer in a clearcoat layer subsequently applied. There can moreover be impairment of the adhesion of a layer of coating material on the impregnated surface.

It is also known from public prior use that clearcoat can be provided with chemical fire-protection agents. Again, a disadvantage is that discoloration of the wood surface can occur, and the flame retardants can undesirably act as plasticizers.

It is an object of the invention to provide a process, and also a coated substrate, of the type mentioned in the introduction which combine(s) good surface properties with good fire protection.

The wood substrate rendered flame-retardant in the invention has, on the substrate, a coating and/or impregnation system with a flame retardant selected from the group consisting of room-temperature-liquid organic halogen compounds and organic phosphorus compounds and organic boron compounds, and also, applied thereto, a layer of coating material.

Some terms used for the purposes of the invention will first be explained. A wood substrate is by way of example a piece of furniture, a wall cladding, or the like.

The substrate can be one manufactured from solid wood or preferably one composed of a wood veneer on a supportive structure. The supportive structure can be particleboard, a sandwich structure, or the like.

The flame retardants used in the invention are liquid at room temperature. This means that at a conventional room temperature of from 10 to 35° C., preferably 23° C., they can be in the liquid physical state when used and applied to the wood substrate. Provided on the substrate, there is a coating and/or impregnation system with said flame retardant. An impregnation system includes complete or partial penetration into pores and other interstices of the substrate, but a coating remains in essence on the surface. Very generally, the invention will involve a hybrid of impregnation system and coating. Preference is given in the invention to an impregnation system where only a small proportion of the flame retardant remains as coating on the surface.

The flame retardants can be organic halogen compounds which are known per se, in particular brominated and chlorinated flame retardants. However, it is preferable that the flame retardants are organic phosphorus compounds or organic boron compounds, and it is further preferable that both of these types of compounds are halogen-free.

The invention applies a layer of coating material, which can be a topcoat or a transparent clearcoat, to the impregnated and/or coated substrate.

The invention has recognized that, surprisingly, wood substrates can be provided with liquid organic flame-protection agents which remain as such in liquid form in or on the wood substrate without undergoing any hardening reaction or drying reaction. Surprisingly, the flame-protection agents can be fixed by a layer of coating material applied thereto which prevents any possible loss of constituents of the flame retardant by evaporation. It is equally surprising that the organic flame retardants used cause no, or only insignificant, impairment of the adhesion of the coating material subsequently applied.

It is particularly preferable that the flame retardant is one selected from the group consisting of phosphoric esters, phosphonic esters, phosphinic esters, and boric esters. The corresponding esters are preferably halogen-free. These are flame retardants which are effective, easy to use, and have no or little toxicity in the event of a fire. In particular, the esters can be alkyl esters.

Examples that may be mentioned of particularly preferred flame retardants are triethyl phosphate, dimethyl propane phosphonate, and triisopropyl borate.

The layer of coating material can be a clearcoat layer. The layer of coating material preferably comprises coatings selected from the group consisting of polyurethane coatings, thioisocyanate coatings, polyester coatings, poly(meth)acrylate coatings, and epoxy coatings.

These are coatings which are in particular used for the coating of wood and wood veneer surfaces in the prior art.

In the case of polyurethane coatings, hardening is achieved by reaction of polyisocyanates with hydroxylated compounds. The hydroxylated component can by way of example be polyesters, polyethers, or acrylic resins. Polyester coatings usually cure via polyaddition of unsaturated compounds. The same is true of poly(meth)acrylates. Suitable coatings are described by way of example in Ullmann's Encyclopedia of Industrial Chemistry, 6th edition, volume 24, pp. 594 ff. (Paints and Coatings); and also volume 39, pp. 515 ff. (Wood, surface treatment) specifically for wood surfaces. The disclosure cited is also incorporated into the subject matter of the present application.

Particular preference is given to polyurethane coating materials and very particular preference is given to thioisocyanate coating materials which can be used in the form of single-component or two-component, or else multi-component coating materials, based on water or on solvent. However, it is possible to use not only said coating materials but also any other coating-material systems. These are inter alia: acrylate coating materials and acrylate coatings, polyester coating materials, epoxy coating materials, and epoxy coatings. The coating materials can comprise any desired fillers and colors, or else can be transparent coating-material systems. It is possible in the invention to add, to the coating material, a further flame retardant in order to increase overall flame retardancy. Various members of the abovementioned classes of compounds are suitable for this purpose. In the event that flame retardants are added to the coating material, it is also possible to use reactive flame retardants appropriately adapted to the respective coating-material system.

The invention further provides a process for the production of the wood substrate of the invention, which comprises the following steps:
  a) application of a flame retardant selected from the group consisting of room-temperature-liquid organic halogen compounds and organic phosphorus compounds and organic boron compounds to the substrate surface;
  b) application of the layer of coating material to the substrate surface equipped with flame retardant.

In the invention, the flame retardant can be applied by a process selected from the group consisting of spray-application, unpressurized immersion, pressure-impregnation, and other methods of application. In particular in the case of pressure-impregnation, the invention can provide that before the application of the flame retardant, the substrate surface is devolatilized under reduced pressure ("vacuum-pressure-impregnation").

The flame retardant used should preferably not cause any impairment of the substrate surface, for example swelling, and should therefore preferably have no, or at most low, water content.

Unpressurized immersion or pressure-impregnation can preferably be carried out in the invention for a period of from 1.5 to 96 h, in particular depending on the type of wood used and the desired depth of penetration of the flame retardant into the wood surface. Air-drying of the substrate surface is possible after the application of the flame retardant and before application of the layer of coating material.

It is preferable that the flame retardant comprises no groups that can react chemically with the subsequently applied coating material or components thereof. In particular in the case of two- or multicomponent coating-material systems which harden via chemical reactions, it is preferable that the flame retardant does not provide any component that can react with any component of the coating material and that could impair the actual hardening reaction of the coating material. The implication of this, depending on the coating-material system used, is by way of example that organic functional groups such as hydroxy, amine, isocyanate, cyanate, epoxy, carbonyl, carboxy, or the like should not be present in the flame retardant.

The wood thus treated can be used in the form of veneers or in the form of solid wood. In air travel, the wood is generally used in the form of veneer and, in order to save weight, is combined with lightweight construction materials (sandwich materials made of outer plies of GRP or CRP and of a core of honeycomb material, or of any other type). However, there is no intention that the application be restricted thereto.

Other conceivable applications are the furniture industry (solid wood and veneer), yacht construction and boat construction (furniture and floors made of solid wood or of veneered materials), rail vehicles, and others.

Examples are used below to illustrate the invention.

EXAMPLE 1

Samples were produced from sandwich boards (100 mm×300 mm×10 mm) composed of a honeycomb core of phenolic-resin-saturated paper, outer plies made of glassfiber-reinforced phenolic resin on both sides, and also real-wood veneer adhesive-bonded to both sides.

One of the edges, length 100 mm, was moreover sealed with a solid-wood edging (cross section 10 mm×5 mm). The woods used were maple, aningre, oak, Makassar, palisander, redwood, and avenge, and veneers and solid wood were from the same type of wood here. The samples were placed in a trough (unpressurized immersion) with triethyl phosphate for a period of 24 hours, and then surface-dried with a cloth. After two hours of air-drying, the reverse side was coated with a thiourethane coating material. Coating material was applied in a plurality of stages here. The first two layers of coating material used thiourethane pore surfacer (Duritan DT-PS, Akzo Nobel). The thiourethane coating material Duritan DT-F (also Akzo Nobel) was used to apply a further four layers.

The resultant samples were tested for fire resistance in the 60 second vertical burn test of FAR/JAR/CS 25.853 Appendix F Part 1 (a) (1) (i). The test is considered to have been passed if average flame time for 3 samples does not exceed 15 seconds and the burnt length does not exceed 155 mm, and material does not drop from the sample during the test, or material that drops does not continue to burn for longer than 3 seconds. All of the structures produced as described above passed this test.

Identical samples in which, however, the unpressurized immersion step was omitted were produced as reference. None of the sample sets composed of three individual samples passed the fire test described, since in each case the average flame time far exceeded the required maximum of 15 seconds.

EXAMPLE 2

Samples with a structure analogous to that of example 1 were produced and rendered flame-retardant by impregnation via unpressurized immersion. Dimethyl propylphosphonate was used as flame retardant in the saturation process here, and coating materials were then applied as described in example 1 to the test samples. All of the structures produced passed the 60 second vertical burn test of FAR/JAR/CS 25.853 Appendix F Part 1 (a) (1) (i).

EXAMPLE 3

Samples were produced with structure analogous to example 1. In this case, the flame-retardant-impregnation process using triethyl phosphate was achieved via brush-application to veneer surfaces and edges, and the number of applications carried out here depended on the type of wood. After two hours of air-drying, the reverse side was coated with a thiourethane coating material. Coating material was applied in a plurality of stages here. The first two layers of coating material used thiourethane pore surfacer (Duritan DT-PS, Akzo Nobel), mixed with 10% by weight of triethyl phosphate prior to application. The thiourethane coating material Duritan DT-F (also Akzo Nobel), also mixed with 10% by weight of triethyl phosphate prior to application was used to apply a further four layers. All of the structures produced passed the 60 second vertical burn test of FAR/JAR/CS 25.853 Appendix F Part 1 (a) (1) (i).

EXAMPLE 4

Test samples of aningre, oak, Makassar, palisander, redwood with dimensions 350 mm×104 mm×52 mm were subjected to a vacuum-pressure-impregnation process. This was composed of an initial phase of 30 minutes at 0.1 bar absolute pressure with a subsequent phase at 8 bar absolute pressure, the time being from 90 minutes to 96 hours (depending on the ease of saturation of the respective type of wood). After air-drying for a number of days, solid-wood edging was sawn from the center, and also from the edge region of the cross section, of said samples, in order to provide edging for fire samples. These edging materials (cross section 5 mm×10 mm, and also 30 mm×30 mm) were used to produce samples with structure analogous to that described in example 1. Said samples were finally coated with a thiourethane coating material. Coating material was applied in a plurality of stages here. The first two layers of coating material used thiourethane pore surfacer (Duritan DT-PS, Akzo Nobel), mixed with 10% by weight of triethyl phosphate prior to application. The thiourethane coating material Duritan DT-F (also Akzo Nobel), also mixed with 10% by weight of triethyl phosphate prior to application was used to apply a further four layers. All of the structures produced passed the 60 second vertical burn test of FAR/JAR/CS 25.853 Appendix F Part 1 (a) (1) (i).

EXAMPLE 5

Test samples were produced (structure and conduct of the flame-retardant-impregnation process analogous to example 1). A water-based 2-component polyurethane coating material was used in this case instead of a thiourethane coating material. The final coating was composed of the eight layers of the coating material Duocryl Hochglanz (Akzo Nobel). All of the structures produced passed the 60 second vertical burn test of FAR/JAR/CS 25.853 Appendix F Part 1 (a) (1) (i).

EXAMPLE 6

Test samples of maple, aningre, oak, Makassar, palisander, redwood, and avenge with cross section 10 mm×10 mm were produced from solid wood. The samples were first deaerated for 30 minutes at an absolute pressure of 0.1 bar so that they could then be impregnated at ambient pressure with tris(2-chloro-1-methylethyl) phosphate (Levagard PP, Lanxess) for 90 minutes. The resultant samples were then surface-dried with a cloth and after 2 hours of air-drying were coated with two layers of thiourethane coating material (Duritan DT-F, Akzo Nobel). The resultant structures passed the 60 second vertical burn test of FAR/JAR/CS 25.853 Appendix F Part 1 (a) (1) (i).

Samples which were not impregnated but to which coating material had been applied as described above were produced from the types of wood mentioned with the dimensions mentioned, as reference. None of the sample sets composed of three individual samples passed the fire test described, since in each case the average flame time far exceeded the required maximum of 15 seconds.

EXAMPLE 7

Test samples of maple, aningre, oak, Makassar, palisander, redwood, and avenge with cross section 10 mm×10 mm were produced from solid wood. The samples were first deaerated for 30 minutes at an absolute pressure of 0.1 bar so that they could then be impregnated at ambient pressure with bis(2-ethylhexyl) tetrabromophthalate (Uniplex FRP 45, Lanxess, mixed with 25% of ethyl acetate) for 90 minutes. The resultant samples were then surface-dried with a cloth and after 2 hours of air-drying were coated with two layers of thiourethane coating material (Duritan DT-F, Akzo Nobel). The resultant structures passed the 60 second vertical burn test of FAR/JAR/CS 25.853 Appendix F Part 1 (a) (1) (i).

What is claimed is:

1. A process for the production of a flame-retardant wood substrate, wherein the process comprises the following steps:
    a) application of a flame retardant selected from the group consisting of room-temperature-liquid organic halogen compounds and organic phosphorus compounds and organic boron compounds to the substrate surface;
    b) application of the layer of coating material to the substrate surface equipped with flame retardant.

2. The process as claimed in claim 1, wherein the flame retardant is applied by a process selected from the group consisting of spray-application, unpressurized immersion, pressure-impregnation, and other methods of application.

3. The process as claimed in claim 1, wherein, before the application of the flame retardant, the substrate surface is devolatilized under reduced pressure.

4. The process as claimed in in claim 1, wherein, after the application of the flame retardant, the substrate surface is air-dried.

5. The process as claimed in claim 1, wherein the unpressurized immersion or the pressure-impregnation is carried out for a period of from 1.5 to 96 h.

6. The process as claimed in claim 1, wherein the flame retardant is one selected from the group consisting of phosphoric esters, phosphonic esters, phosphinic esters, and boric esters.

7. The process as claimed in claim 6, wherein the flame retardant is an alkyl ester.

8. The process as claimed in claim 7, wherein the flame retardant is one selected from the group consisting of triethyl phosphate, dimethyl propane phosphate and triisopropyl borate.

9. The process as claimed in claim 1, wherein the layer of coating material is a clearcoat layer.

10. The process as claimed in claim 1, wherein the layer of coating material comprises coatings selected from the group consisting of polyurethane coatings, thioisocyanate coatings, polyester coatings, poly(meth)acrylate coatings, and epoxy coatings.

* * * * *